(12) United States Patent
Pettenon et al.

(10) Patent No.: US 12,239,110 B2
(45) Date of Patent: Mar. 4, 2025

(54) SKIMMER FOR AQUARIUMS

(71) Applicants: Paolo Pettenon, Cittadella (IT); Marco Pierobon, Padua (IT); Federico Carraro, Rubano (IT); James A Rogers, Madison, GA (US)

(72) Inventors: Paolo Pettenon, Cittadella (IT); Marco Pierobon, Padua (IT); Federico Carraro, Rubano (IT); James A Rogers, Madison, GA (US)

(73) Assignee: SEACHEM LABORATORIES, INC., Madison, GA (US)

( * ) Notice: Subject to any disclaimer, the term of this patent is extended or adjusted under 35 U.S.C. 154(b) by 1012 days.

(21) Appl. No.: 17/265,898

(22) PCT Filed: Nov. 19, 2020

(86) PCT No.: PCT/IB2020/060922
§ 371 (c)(1),
(2) Date: Feb. 4, 2021

(87) PCT Pub. No.: WO2021/099989
PCT Pub. Date: May 27, 2021

(65) Prior Publication Data
US 2022/0110301 A1    Apr. 14, 2022

(30) Foreign Application Priority Data

Nov. 19, 2019    (IT) .................. 102019000021591

(51) Int. Cl.
*A01K 63/04*    (2006.01)

(52) U.S. Cl.
CPC .......... *A01K 63/045* (2013.01); *A01K 63/047* (2013.01)

(58) Field of Classification Search
CPC .......................... A01K 63/042; A01K 63/047
See application file for complete search history.

(56) References Cited

U.S. PATENT DOCUMENTS

| 6,808,625 | B1 | 10/2004 | Wu | |
|---|---|---|---|---|
| 7,445,706 | B2 * | 11/2008 | Liu | A01K 63/045 |
| | | | | 210/167.26 |
| 8,216,477 | B2 * | 7/2012 | Weidl | A01K 63/04 |
| | | | | 210/615 |

FOREIGN PATENT DOCUMENTS

WO    01/32562 A1    5/2001

* cited by examiner

*Primary Examiner* — Bradley R Spies
(74) *Attorney, Agent, or Firm* — Carmel Patent Agency; Robert Ballarini (57) ABSTRACT

A skimmer (1) for aquariums comprises a base (10) and a container (20) which is provided with at least two lateral connectors (21, 22) which comprise a main connector (22) and an auxiliary connector (21). The skimmer further comprises a cup (30), in which the foam is collected. The base comprises at least four openings, a first opening (11) and a second opening (12) opening inside the container (20) and being connected to a third opening (13) and a fourth opening (14), respectively, so that the skimmer can operate at least in two different configurations: a first single-pump configuration and a second double-pump configuration.

18 Claims, 6 Drawing Sheets

SKIMMER FOR AQUARIUMS

CROSS REFERENCE TO RELATED APPLICATIONS

The present application is a § 371 U.S. National Phase of PCT/IB2020/060922, filed Nov. 19, 2020, which claims priority of Italian patent application number 102019000021591, filed Nov. 19, 2019, the entire contents of all of which are incorporated by reference herein as if fully set forth.

FIELD OF THE INVENTION

The invention relates to a skimmer (or foaming unit or foamer), in particular for marine aquariums, which is provided with a configurable base, which allows the skimmer to operate in two different configurations in accordance with the needs of the user.

BACKGROUND

Generally, skimmers are devices which produce, by mixing water and air, a foam which is dense to a greater or lesser extent and which contains phenols, albumin, colouring agents and proteins. This foam is collected in a cup in order then to be disposed of, thereby removing the undesirable substances from the water.

The prior art divides skimmers into mainly two categories: systems with two pumps and systems with a single pump.

The document U.S. Pat. No. 6,808,625B1 describes both categories of skimmer as alternatives in the prior art.

The dual-pump system has a dedicated pump simply for charging the water and another pump which is dedicated to the internal recirculation and production of the foam by means of an intake Venturi tube, which pump mixes the water taken from the contact chamber and places it back in the chamber itself. This system provides a greater possibility for adjustment and a greater stability of the adjusted parameters. It is possible to separately adjust the incoming water flow and the level in the contact chamber, the quantity of air processed, independently with respect to the water level in the tank, which receives the skimmer.

The single-pump system is constituted by a pump, which takes in water from the tank and air from the Venturi tube, by introducing it into the contact chamber. This construction type of skimmers has become widespread because it is structurally simpler and economical and, mistakenly, the belief that a pump, which performs both the functions can consume less electrical energy has become widespread. These conditions have led to the single-pump system becoming the most widespread one on the market. In reality, this system is more unstable because it is more susceptible to the various changes of the water conditions and the water level in the tank itself and in the majority of cases it requires continuous control adjustments.

Therefore, the problem addressed by the present invention is to provide a skimmer for aquariums, which is structurally and functionally configured to at least partially overcome one or more of the disadvantages set out with reference to the cited prior art.

Another object of the invention is to provide a skimmer, which can be particularly versatile during use while maintaining a structure, which is generally simple.

SUMMARY

This problem is solved by the invention by means of a skimmer, which is constructed according to one or more of the features mentioned in the appended claims.

In particular, the skimmer (or foamer) to which the invention relates is a skimmer for aquariums comprising a base and a container which is provided with at least two lateral connectors which comprise a main connector which is configured for connecting a pump for generating a mixed flow of water and air which is introduced into the container through the main connector and which, by rising upwards, forms a foam, and an auxiliary connector which is configured for connecting an additional pump for supplying water inside the container or alternatively for being closed by means of a first closure element. The skimmer further comprises a cup, in which the foam is collected.

According to an aspect of the invention, the base of the skimmer comprises at least four openings, a first opening and a second opening which open inside the container and which are connected to a third opening and a fourth opening, respectively. Consequently, the skimmer can advantageously operate at least in two different configurations:
- a single-pump configuration, in which the auxiliary connector is closed by means of the first closure element and the third opening is closed by a second closure element so that the pump operates both as a water supply pump inside the container and as a foaming pump for producing foam in the skimmer;
- a double-pump configuration which provides for the connection of the additional pump, which is suitable for supplying water inside the container, to the auxiliary lateral connector and which provides for the connection of the pump to the third opening of the base and the main connector of the container.

Therefore, the skimmer uses a base, which allows the water to be recirculated in the event that a double pump is desired or the recirculation to be excluded if a single pump is desired. Furthermore, the flows can be inverted as desired, obtaining a versatile system, which allows the production of different filtering systems. In this manner, the product can be used by the end client as a single pump or double pump in accordance with the configuration, which pleases him/her the most.

Preferably, the base of the skimmer comprises a pipe, which connects the second opening, which is preferably located under the container, to the fourth opening connected to a discharge. The treated water, which moves to the discharge is then re-introduced into the aquarium.

Preferably, the discharge comprises a discharge column, a discharge level regulation element and a textile bag.

If the skimmer is used in a service tank or "sump" which is provided with various compartments, the discharge is sufficiently high to allow the treated water to flow away into another compartment of the service tank, also overcoming high bulkheads which separate the various compartments. Preferably, the discharge comprises a textile bag, which allows the discharge of micro air bubbles generated by the skimmer to be limited or the water discharge to be made silent. If the skimmer is used as a generic filter, the textile bag blocks undesirable particles in the aquarium.

In some preferred solutions, the cup comprises a handle, a cover and a foam discharge. This allows the user to empty the cup manually or alternatively to use the discharge of the cup, which is placed in communication with another larger container in order to store a greater quantity of foam.

Preferably, the skimmer comprises an air supply pipe, which is configured at one end for connecting the pump and at the other end for connecting an air inlet regulator.

When the foamer operates in a double-pump configuration, the first opening, which is located under the container, is connected to the third opening. In this configuration, there is generated a recirculation of water inside the base of the skimmer.

Preferably, the skimmer comprises a water inlet pipe, which is configured at one end for connecting the additional pump and at the other end for connecting the auxiliary connector of the container.

BRIEF DESCRIPTION OF THE DRAWINGS

The features and advantages of the invention will be better appreciated from the detailed description of a number of embodiments thereof which are illustrated by way of non-limiting example with reference to the appended drawings, in which.

DETAILED DESCRIPTION OF THE PREFERRED EMBODIMENTS

In the Figures, there is generally designated 1 the skimmer for aquariums, which is also referred to as a foamer or foaming unit. As will be better appreciated below, the skimmer 1 of the present invention can function in at least two different configurations: single-pump configuration or double-pump configuration.

The skimmer comprises a container 20 which is substantially cylindrical and which has a base 20A, two lateral connectors, which comprise a main connector 22 and an auxiliary connector 21 and an open upper end 20B. At the inner side of the container 20, also called the contact chamber, the mixing of water and air takes place. The mixed flow of water and air contains a large number of air bubbles, which rise vertically inside the container 20, which is filled with water, generating a foam which carries with it the harmful substances present in the water.

In some embodiments, at the open upper end 20B there is mounted a cup 30, which is closed at the upper side by means of a cover 33 and which is provided with a discharge 32 and a handle 31.

The cup 30 is suitable for receiving the foam, which rises from the container 20 and for storing it until full. The user can decide whether to empty the cup 30 manually or to use the discharge of the cup 32 which can be placed in communication with another, larger container which is not illustrated. The organic material is removed by the foam being removed.

Figure 3:
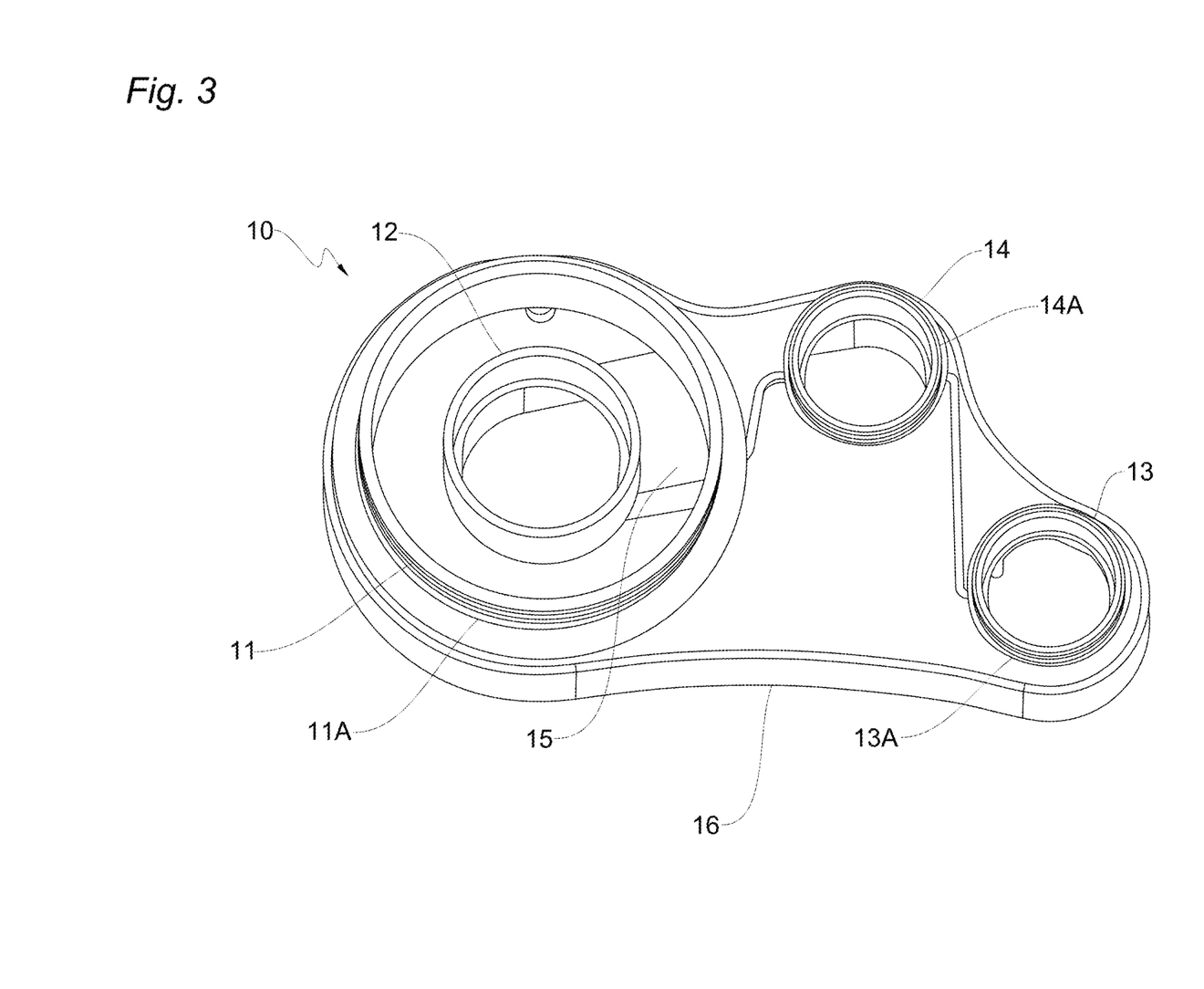
FIG. 3 is a perspective view of the configurable base of the skimmer.

In the exemplary embodiment in the Figures, the base 10 has a shaped body 16, which is substantially of planar form and provides four openings, a first opening 11, a second opening 12, a third opening 13 and a fourth opening 14. Preferably, the first opening 11, third opening 13 and fourth opening 14 are provided with a threaded zone 11A, 13A and 14A, respectively, which is suitable for receiving devices which are intended to be applied to the base 10. The member 16 of the base 10 is preferably internally hollow.

The container 20 is connected to the first opening 11 in such a manner that the first opening 11 and the second opening 12 open inside the container 20. In some embodiments, the second opening 12 is positioned inside the first opening 11. Preferably, the first opening 11 and the second opening 12 are concentric.

Figure 2A:
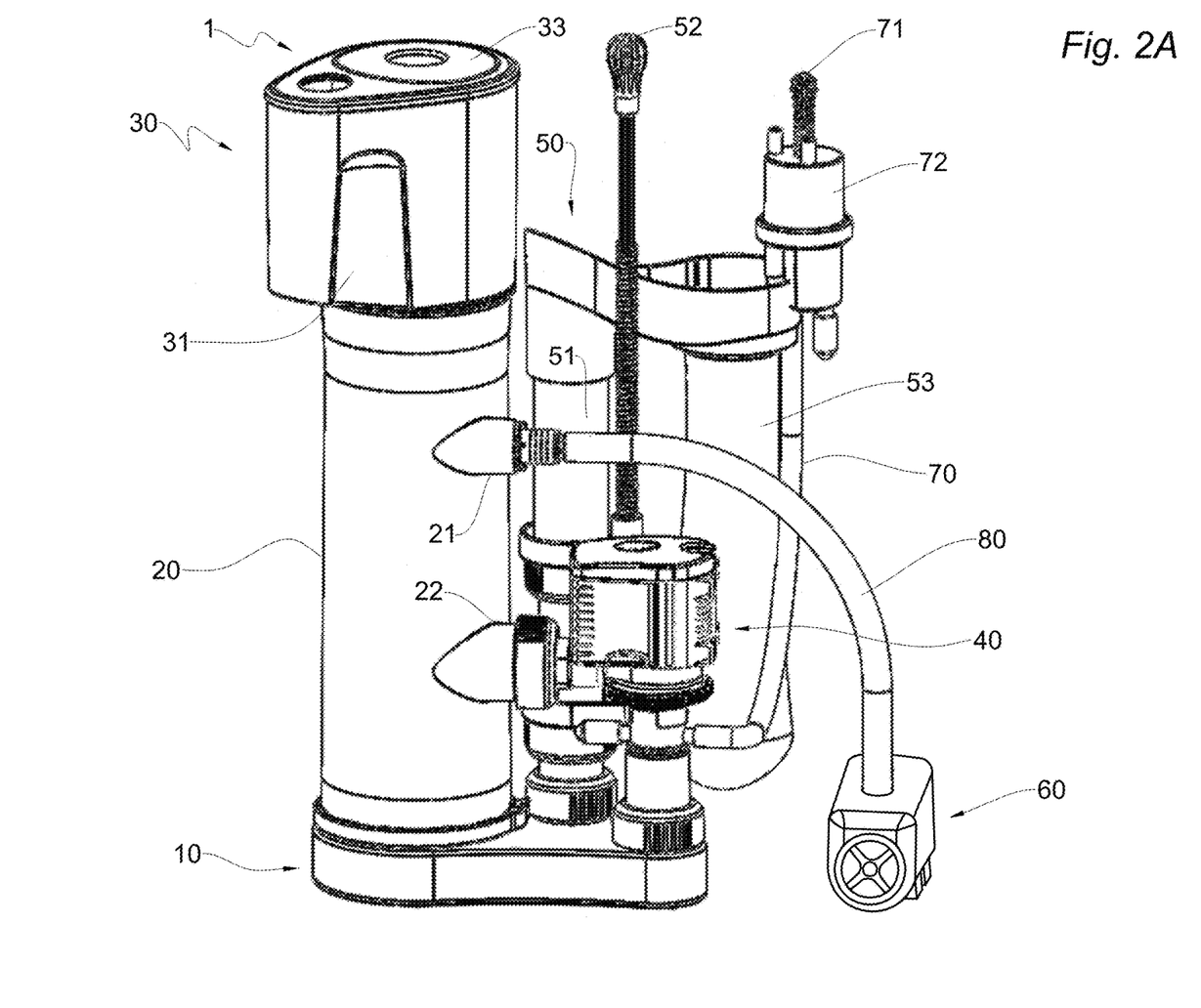
FIG. 2A is a perspective view of the skimmer in a double-pump configuration.
Figure 2B:
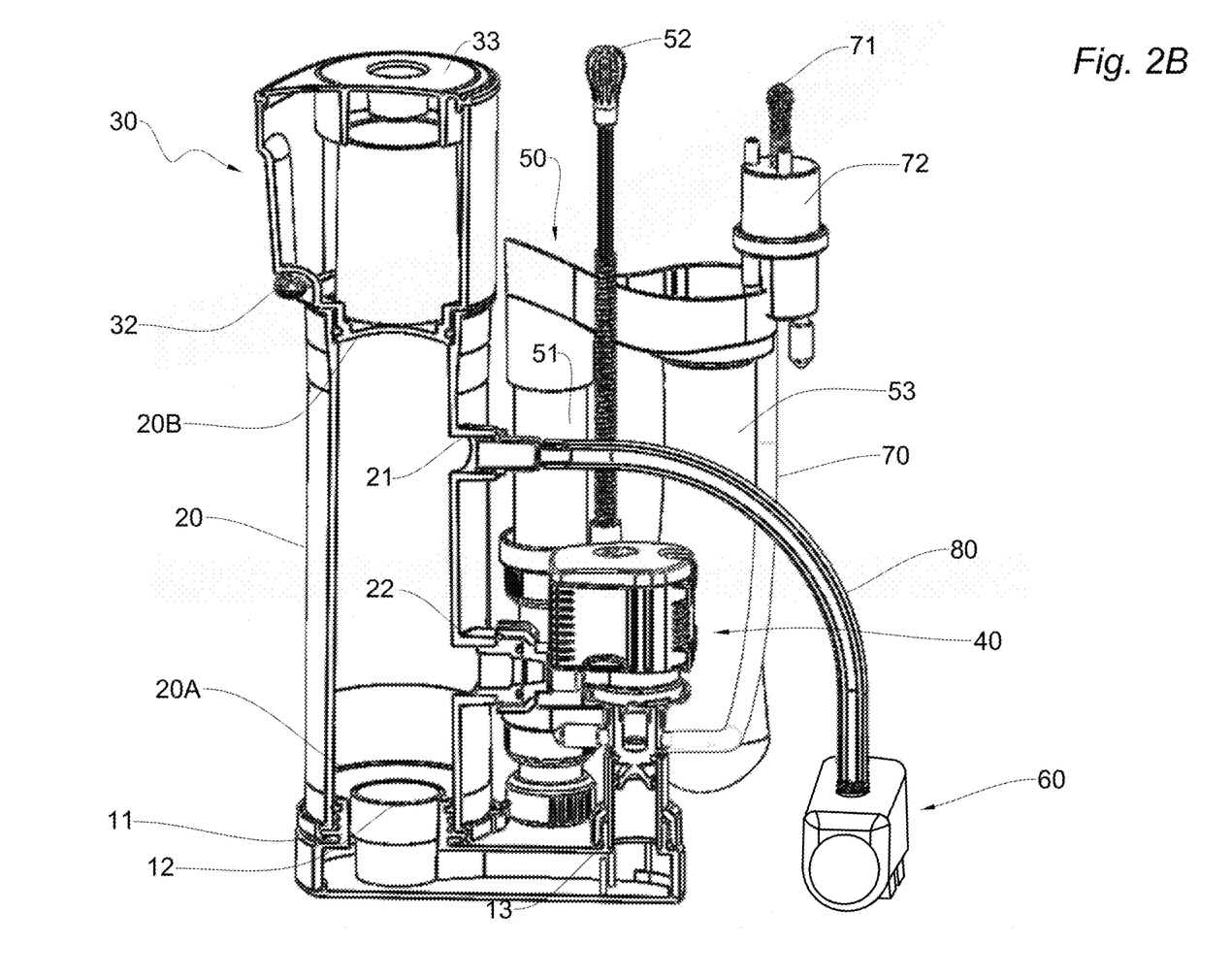
FIG. 2B is a cross-section of the preceding Figure.

When the skimmer operates in a double-pump configuration, the third opening 13 is connected to a pump 40. The water which comes from the container 20 passes initially from the first opening 11, then internally through the base 10 and is finally discharged from the third opening 13. The water is then impelled by the pump 40 again into the container 20, passing from the main connector 22, to which the pump 40 is connected.

In some embodiments, the base 10 is hollow internally so as to define an internal pipe, which connects the first opening 11 and the third opening 13 in accordance with what is set out above.

Preferably, the second opening 12 is connected to the fourth opening 14 via a pipe 15, which is located inside the body 16 of the base 10.

The fourth opening 14 is connected to a discharge 50 via which the treated water, which is intended to return to the aquarium, (not illustrated) passes.

Preferably, the discharge 50 comprises a discharge column 51. In some embodiments, the discharge 50 has a rim overflow so that the level inside the container 20 is determined by an overflow, which makes it stable whatever the rate of the water flow during both single use and double use.

Preferably, the discharge 50 comprises a discharge level regulator 52. If the skimmer 1 is used in a service tank or "sump", which is not illustrated and which is provided with various compartments, the discharge 50 is sufficiently high to allow the discharge of the treated water into another compartment of the service tank, also overcoming high bulkheads which separate the various compartments.

Preferably, the discharge 50 comprises a textile bag 53. Using the textile bag 53 in the discharge 50 allows a limitation of the discharge of micro bubbles of air, which are generated by the foaming and the water discharge to be made silent. If the skimmer 1 is used as a generic filter, the textile bag 53 blocks undesirable particles in the aquarium.

Figure 1A:
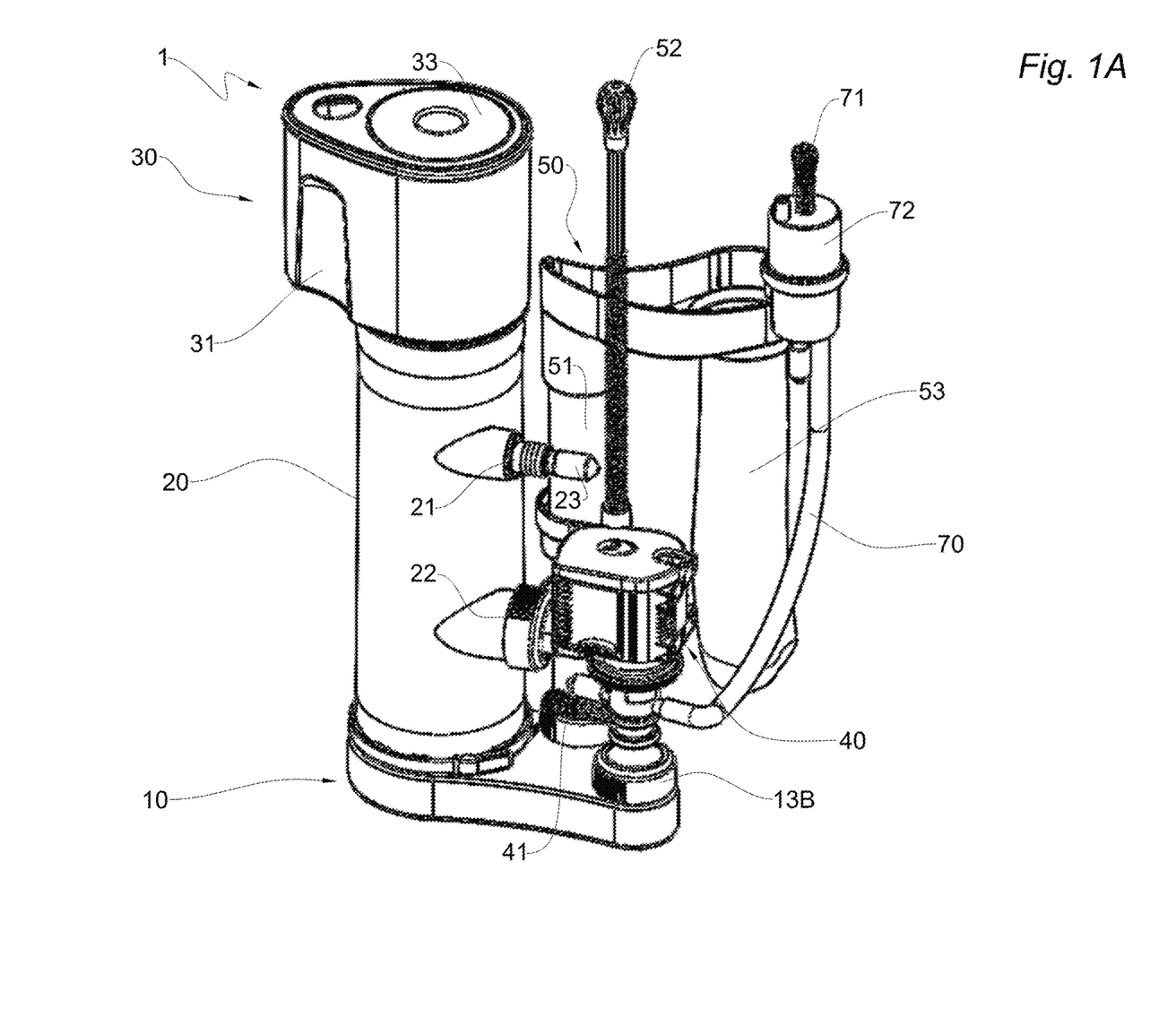
FIG. 1A is a perspective view of the skimmer in a single-pump configuration.
Figure 1B:
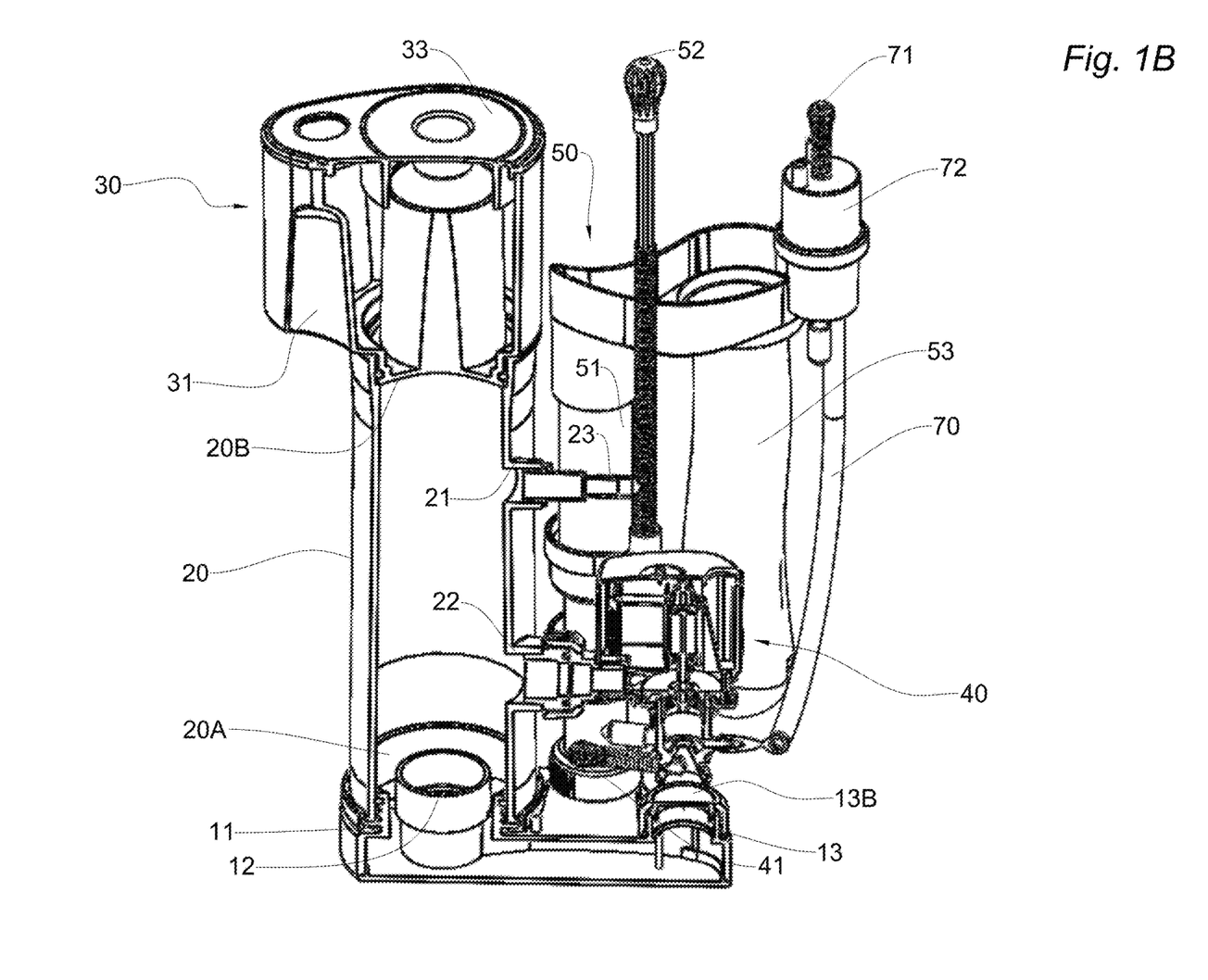
FIG. 1B is a cross-section of the preceding Figure.

When the skimmer 1 operates in a single-pump configuration, the pump 40 operates both as a water supply pump, coming from the aquarium or the service tank or "sump", which are not illustrated, and as a foaming pump.

The pump 40 preferably comprises a water inlet regulator 41, which regulates the water flow rate being introduced.

The pump 40 receives the air to be mixed with the water via an air supply pipe 70, for example, the tube depicted. Preferably, the air supply pipe is connected to an air inlet regulator 71. Preferably, the air inlet regulator 71 is provided with an air silencer 72, which reduces the noise during the air intake step.

Therefore, the pump 40 receives both water to be treated and air, and introduces both into the container 20, where the foaming takes place, via the main connector 22 of the container 20.

In the case of a single-pump configuration, the auxiliary connector 21 is kept closed by a first closure element 23, for example, a cap as can be seen in the Figures. In this configuration, the third opening 13 of the base 10 is closed by a second closure element 13B, for example, a cap as can be seen in the Figures. Inside the container 20, the mixed flow of water and air rises vertically, generating the foam, which will be stored in the cup 30, while the treated water passes into the second opening 12 of the base 10. The water then passes through the pipe 15 and the fourth opening 14, is introduced into the discharge 50 in order then to be reintroduced into the aquarium, which is not illustrated. As mentioned above, in this configuration the third opening 13 of the base 10 is kept closed.

When the skimmer 1 operates in a double-pump configuration, as mentioned above, there is provided an additional pump 60 which is also referred to as the supply pump and which is dedicated to the supply of water to be treated which is taken from the aquarium or the service tank or "sump", which are not illustrated. The supply pump 60 is connected to the auxiliary connector 21 of the container 20 through a water inlet tube 80.

In this case, the pump 40 operates only as a foaming pump. The pump 40 is mounted on the third opening 123 of the base 10 so as to receive water from the container 20. The water, which arrives at the pump 40, in fact passes through the first opening 11, is introduced into the body 16 of the base 10 and arrives at the pump 40 through the third opening 13.

The pump 40 also receives in this case the air to be mixed with the water via an air supply pipe 70, for example, the tube depicted. Preferably, the air supply pipe 70 is connected to an air inlet regulator 71. Preferably, the air inlet regulator 71 is provided with an air silencer 72, which reduces the noise during the air intake step.

Inside the container 20, the mixed flow of water and air rises vertically, generating the foam, which will be stored in the cup 30, while the treated water passes into the second opening 12 of the base 10. The water then passes through the pipe 15 and the fourth opening 14, is introduced into the discharge 50 in order then to be reintroduced into the aquarium, which is not illustrated.

Figure 4:
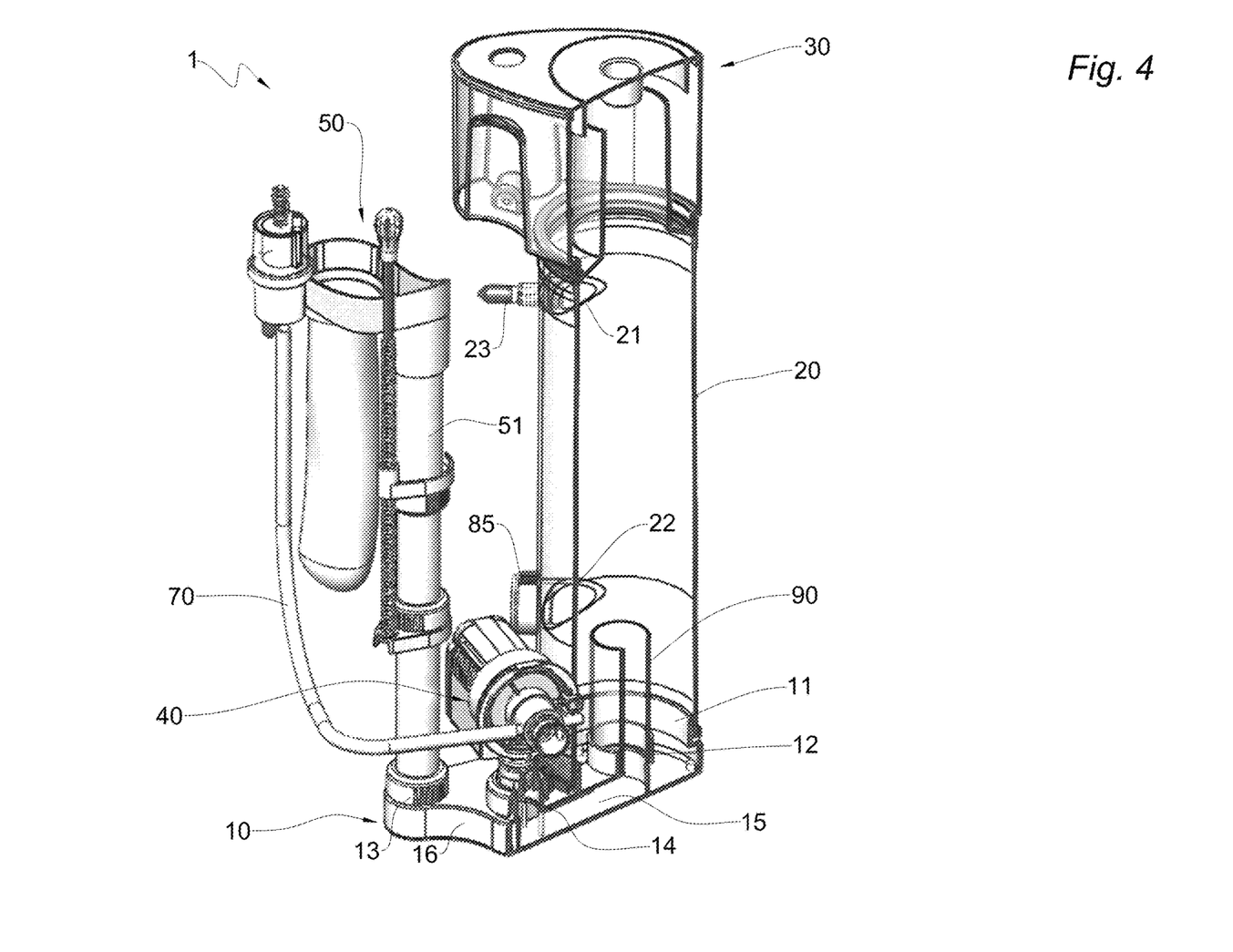
FIG. 4 is a cross-section of the skimmer according to the present invention in an additional operating configuration.

FIG. 4 illustrates an additional configuration of the skimmer 1, which is generally referred to as a "reverse" configuration. In this configuration, the pump 40 is connected to the fourth opening 14 of the base 10: the water mixed with the air is impelled into the fourth opening 14 by the pump 40, passes into the pipe 15 and is discharged from the second opening 12 to which a central tube 90 is connected. The water mixed with the air rises through the central tube 90 in order to enter the container 20, where the foam, which rises towards the cup 30 is generated. The treated water tends to sink towards the first opening 11, to pass through the hollow body of the base 10 and to be discharged from the third opening 13, to which the discharge 50 is connected in order then to be reintroduced into the aquarium, which is not illustrated. The pump 40 is connected to the air supply pipe 70. The main connector 22 is closed by a third closure element 85, for example, a cap, as can be seen in the Figures. The auxiliary connector 21 is closed by the first closure element 23. This configuration allows a greater quantity of water to be treated without discharging micro bubbles from the discharge.

Therefore, the skimmer according to the invention allows ready adaptation to the different configurations required for the production of foam in marine aquariums, therefore being found to be extremely versatile and simple to use.

Naturally, the details of construction and the embodiments may be varied with respect to what has been described and illustrated, without thereby departing from the scope of the present invention, as defined by the appended claims. More specifically, the three different configurations illustrated are intended to be purely illustrative, it being possible to use the skimmer according to additional configurations in accordance with the operating requirements and the preferences of the user.

The invention claimed is:

1. A skimmer (1) comprising a base (10) and a container (20) which is provided with at least two lateral connectors (21, 22) which comprise a main connector (22) which is configured for connecting a pump (40) for generating a mixed flow of water and air which is introduced into the container (20) through the main connector (22) and which, by rising upwards, forms a foam, and an auxiliary connector (21) which is configured for connecting an additional pump (60) for supplying water inside the container (20) or alternatively for being closed by means of a first closure element (23), the skimmer (1) further comprising a cup (30), in which the foam is collected, the base (10) comprises at least four openings (11, 12, 13, 14), a first opening (11) and a second opening (12) opening inside the container (20) and being connected to a third opening (13) and a fourth opening (14), respectively, so that the skimmer (1) can operate at least in two different configurations:
   a first single-pump configuration, in which the auxiliary connector (21) is closed by means of the first closure element (23) and the third opening (13) is closed by a second closure element (13B) so that the pump (40) operates both as a water supply pump inside the container (20) and as a foaming pump for producing foam in the skimmer (1); and
   a second double-pump configuration which provides for the connection of the additional pump (60), which is suitable for supplying water inside the container (20), to the auxiliary lateral connector (21) and which provides for the connection of the pump (40) to the third opening (13) of the base (10) and the main connector (22) of the container (20).

2. The skimmer (1) according to claim 1, wherein the base (10) comprises a pipe (15) which connects the second opening (12), which is located under the container (20), to the fourth opening (14), preferably connected to a discharge (50).

3. The skimmer (1) according to claim 2, wherein the discharge (50) comprises a discharge column (51), a discharge level regulation element (52) and a textile bag (53).

4. The skimmer (1) according to claim 1, wherein the cup (30) comprises a handle (31), a cover (33) and a foam discharge (32).

5. The skimmer (1) according to claim 1, wherein the skimmer (1) comprises an air supply pipe (70) which is configured at one end for connecting the pump (40) and at the other end for connecting an air inlet regulator (71).

6. The skimmer (1) according to claim 1, wherein the first opening (11), which is located under the container (20), is connected to the third opening (13) when the skimmer operates in a double-pump configuration.

7. The skimmer (1) according to claim 1, wherein the skimmer comprises a water inlet pipe (80) which is configured at one end for connecting the additional pump (60) and at the other end for connecting the auxiliary connector (21) of the container (20).

8. The skimmer (1) according to claim 1, wherein the second opening (12) is positioned inside the first opening (11).

9. The skimmer according to claim 8, wherein the first opening (11) and the second opening (12) are concentric.

10. The skimmer (1) according to claim 1, wherein the first opening (11), the third opening (13) and the fourth opening (14) are provided with a threaded zone (11A), (13A)

(14A), respectively, which is adapted to receive devices which are to be applied to the base (10).

11. The skimmer (1) according to claim 1, wherein the pump (40) comprises a water inlet regulator (41) which is configured so as to regulate a water flow rate being introduced.

12. The skimmer according to claim 5, wherein the air inlet regulator (71) comprises an air silencer (72) which is configured so as to reduce the noise during the air intake step.

13. The skimmer (1) according to claim 1, wherein the container (20) has a substantially cylindrical form.

14. The skimmer (1) according to claim 1, wherein the container (20) defines a base and at least one side wall.

15. The skimmer according to claim 14, wherein the lateral connectors (21, 22) are formed on the at least one side wall.

16. The skimmer (1) according to claim 1, wherein the container (20) defines an open upper end (20B).

17. The skimmer according to claim 16, wherein the cup (30) is arranged at the open upper end (20B).

18. The skimmer according to claim 16, wherein the auxiliary connector (21) is arranged in a position vertically closer to the open upper end (20B) with respect to the main connector (22).

\* \* \* \* \*